United States Patent
Ito

(10) Patent No.: US 11,390,745 B2
(45) Date of Patent: Jul. 19, 2022

(54) AROMATIC POLYSULFONE, AROMATIC POLYSULFONE COMPOSITION, AND METHOD FOR PRODUCING AROMATIC POLYSULFONE

(71) Applicant: Sumitomo Chemical Company, Limited, Tokyo (JP)

(72) Inventor: Kazuyuki Ito, Tsukuba (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 253 days.

(21) Appl. No.: 16/498,040

(22) PCT Filed: Mar. 27, 2018

(86) PCT No.: PCT/JP2018/012318
§ 371 (c)(1),
(2) Date: Sep. 26, 2019

(87) PCT Pub. No.: WO2018/181259
PCT Pub. Date: Oct. 4, 2018

(65) Prior Publication Data
US 2020/0024451 A1  Jan. 23, 2020

(30) Foreign Application Priority Data

Mar. 30, 2017  (JP) ............................ JP2017-067844

(51) Int. Cl.
*C08L 81/06* (2006.01)
*C08G 75/23* (2006.01)

(52) U.S. Cl.
CPC .............. *C08L 81/06* (2013.01); *C08G 75/23* (2013.01); *C08L 2205/025* (2013.01)

(58) Field of Classification Search
CPC ....... C08J 2381/06; C08J 5/18; C08G 75/205; C08G 75/23; C08G 65/40; G01N 2030/486; C08L 81/06
See application file for complete search history.

(56) References Cited

U.S. PATENT DOCUMENTS

| | | | |
|---|---|---|---|
| 4,026,977 | A | 5/1977 | Bourganel |
| 5,036,146 | A | 7/1991 | Hedtmann-Rein et al. |
| 5,804,629 | A | 9/1998 | Weber et al. |
| 5,911,880 | A | 6/1999 | Klein et al. |
| 6,562,935 | B1 | 5/2003 | Harada |
| 2003/0224222 | A1 | 12/2003 | Matsuoka et al. |
| 2011/0210290 | A1 | 9/2011 | Harada et al. |

FOREIGN PATENT DOCUMENTS

| | | |
|---|---|---|
| CN | 102199284 A | 9/2011 |
| CN | 104870519 A | 8/2015 |
| EP | 0233966 A1 | 9/1987 |
| EP | 0311349 A2 | 4/1989 |
| EP | 0378106 A2 | 7/1990 |
| EP | 1544231 A1 | 6/2005 |
| EP | 2937374 A1 | 10/2015 |
| JP | 02-058569 A | 2/1990 |
| JP | 02-215837 A | 8/1990 |
| JP | 07-018172 A | 1/1995 |
| JP | 07-017745 B2 | 3/1995 |
| JP | H07-150035 A | 6/1995 |
| JP | 2501421 B2 | 5/1996 |
| JP | 2501422 B2 | 5/1996 |
| JP | 2002-504603 A | 2/2002 |
| JP | 2015-507034 A | 3/2015 |
| JP | 2015-508437 A | 3/2015 |
| WO | 99/43731 A2 | 9/1999 |
| WO | 2013/087592 A2 | 6/2013 |
| WO | 2013/141916 A2 | 9/2013 |

OTHER PUBLICATIONS

Hedrick et al, "Morphology and fracture toughness of thermoplastic modified epoxy resin networks prepared via electromagnetic processing," Polymer Preprints, vol. 29, No. 1, pp. 363-365 (Jun. 1988).
Hedrick et al, "Chemical modification of matrix resin networks with engineering thermoplastics: 1. Synthesis, morphology, physical behaviour and toughening mechanisms of poly(arylene ether sulphone) modified epoxy networks," Polymer, vol. 32, No. 11, pp. 2020-2032 (1991).
MacKinnon et al, "Cure and Physical Properties of Thermoplastic Modified Epoxy Resins Based on Polyethersulfone," Journal of Applied Polymer Science, vol. 58, pp. 2345-2355 (1995).
Yoon et al, "Mechanical and Morphological Investigations of Reactive Polysulfone Toughened Epoxy Networks," Macromolecular Symposia, vol. 98, pp. 673-686 (1995).
Int'l Search Report dated Jun. 12, 2018 in Int'l Application No. PCT/JP2018/012318.
Examination Report dated Apr. 30, 2021 in IN Application No. 201947039561.
Office Action dated Jan. 26, 2021 in JP Application No. 2017067844 (with English Machine Translation).
Extended European Search Report dated Sep. 25, 2020 in EP Application No. 18774464.4.

(Continued)

*Primary Examiner* — Shane Fang
(74) *Attorney, Agent, or Firm* — Panitch Schwarze Belisario & Nadel LLP

(57) ABSTRACT

An aromatic polysulfone includes an amino group-containing aromatic polysulfone containing a repeating unit represented by the following general formula (A) and having an amino group at a polymer chain end. The aromatic polysulfone has a weight average absolute molecular weight (Mw) of 20,000 g/mol or more and a reduced viscosity (unit: dL/g) of 0.30 or more.

$$-Ph1-SO_2-Ph2-O- \qquad (A)$$

In formula (A), Ph1 and Ph2 are each independently a phenylene group which may have a substituent.

4 Claims, No Drawings

(56) References Cited

OTHER PUBLICATIONS

Jurek et al., Synthesis and characterization of amine terminated poly(arylene ether sulphone) oligomers, 30(8) Polymer, Elsevier Science Publishers B. V, GB 1552-1557 (Aug. 1989).
Examination Report dated Jul. 13, 2021 in JP Application No. 2017067844 (with English Machine Translation).
Office Action dated Aug. 18, 2021 in CN Application No. 201880020850.4 (with English Machine Translation).
Zhang, L., "Synthesis of Poly(Arylene Ether Suphone)s Terminated with Active Functional Groups," Lizi Exchange and Adsorption, Issue 4, pp. 368-377 (1996) (with Abstract).
Examination Report dated Feb. 14, 2022 in IN Application No. 201947039561.
Office Action dated Jan. 11, 2022 in CN Application No. 201880020850.4.
Office Action dated Apr. 5, 2022 in EP Application No. 18774464.4.
Office Action dated May 20, 2022 in Chinese Application No. 201880020850.4.
Office Action dated May 23, 2022 in KR Application No. 1020197028192 (with English Machine Translation).

AROMATIC POLYSULFONE, AROMATIC POLYSULFONE COMPOSITION, AND METHOD FOR PRODUCING AROMATIC POLYSULFONE

CROSS-REFERENCE TO RELATED APPLICATION

This application is a Section 371 of International Application No. PCT/JP2018/012318, filed Mar. 27, 2018, which was published in the Japanese language on Oct. 4, 2018 under International Publication No. WO 2018/181259 A1, which claims priority under 35 U.S.C. § 119(b) to Japanese Application No. 2017-067844, filed Mar. 30, 2017, the disclosures of which are incorporated herein by reference in their entirety.

TECHNICAL FIELD

The present invention relates to an aromatic polysulfone, an aromatic polysulfone composition, and a method for producing an aromatic polysulfone.

BACKGROUND ART

Since aromatic polysulfones are one type of amorphous thermoplastic resins and are excellent in heat resistance, mechanical properties and transparency, they are used for various applications, such as parts of electronic devices, as forming materials of molded articles and films.

Aromatic polysulfones are also used as epoxy reinforcing agents. Patent Document 1 describes an epoxy resin composition using an aromatic polysulfone containing a highly reactive amino group as an epoxy reinforcing agent. In Patent Document 1, the viscosity is reduced by mixing a resin containing a phenolic hydroxyl group, and favorable processability is maintained.

In Patent Document 1, a low molecular weight resin having substantially a weight average molecular weight of about 10,000 is used as an aromatic polysulfone containing an amino group.

CITATION LIST

Patent Document

[Patent Document 1] Published Japanese Translation No. 2015-507034 of the PCT International Publication

SUMMARY OF INVENTION

Technical Problem

Incidentally, aromatic polysulfones are also used as adhesives, and high adhesiveness is desired.

From the viewpoint of exhibiting high adhesiveness, there is room for improvement in the existing aromatic polysulfones.

The present invention takes the above circumstances into consideration, with an object of providing an aromatic polysulfone that exhibits high adhesiveness, an aromatic polysulfone composition, and a method for producing an aromatic polysulfone.

Solution to Problem

As a result of intensive studies, the inventors of the present invention have discovered that a specific aromatic polysulfone having a high molecular weight and having an amino group at the end of the polymer chain exhibits high adhesiveness.

That is, the present invention includes the following aspects.

[1] An aromatic polysulfone including an amino group-containing aromatic polysulfone substantially composed of a repeating unit represented by the following general formula (A) and having an amino group at a polymer chain end, and having a weight average absolute molecular weight (Mw) of 20,000 g/mol or more and a reduced viscosity (unit: dL/g) of 0.30 or more.

$$-Ph1-SO_2-Ph2-O- \quad (A)$$

(Ph1 and Ph2 are each independently a phenylene group which may have a substituent.)

[2] The aromatic polysulfone according to [1], which has a glass transition temperature (Tg) of 220° C. or higher.

[3] The aromatic polysulfone according to [1] or [2], wherein the number of amino groups at the aforementioned polymer chain end is 0.4 or more per 100 repeating units represented by the aforementioned formula (A).

[4] An aromatic polysulfone composition including the aromatic polysulfone according to any one of [1] to [3] and another different aromatic polysulfone.

[5] A method for producing an aromatic polysulfone, including a step of allowing a polycondensation reaction between a phenoxy end or phenolate end of a polymer generated as a by-product and a halogen end by condensing an aromatic halogenosulfone compound with an amino compound, wherein the aforementioned polycondensation reaction includes steps of: mixing the aforementioned aromatic halogenosulfone compound and the aforementioned amino compound such that a molar ratio of an amino group of the aforementioned amino compound with respect to a halogen atom at an end of the aforementioned aromatic halogenosulfone compound is less than 1.0; and reacting while heating at a temperature higher than 180° C.

Advantageous Effects of Invention

According to the present invention, it is possible to provide an aromatic polysulfone that exhibits high adhesiveness, an aromatic polysulfone composition, and a method for producing an aromatic polysulfone.

DESCRIPTION OF EMBODIMENTS

<Aromatic Polysulfone>

An aromatic polysulfone according to an embodiment of the present invention includes an amino group-containing aromatic polysulfone substantially composed of a repeating unit represented by the general formula (A) and having an amino group at least at one end of the polymer chain (that is, an amino group-containing aromatic polysulfone described later). Since the aromatic polysulfone of the present invention has a highly reactive amino group at the end of the polymer chain, it can exhibit high adhesiveness with respect to metals such as copper and iron, alloys such as stainless steel, glass, and the like.

(Amino Group-Containing Aromatic Polysulfone)

In the present embodiment, the aromatic polysulfone includes an amino group-containing aromatic polysulfone. The amino group-containing aromatic polysulfone is substantially composed of a repeating unit represented by the following general formula (A), and has an amino group (—NH₂) at least at one end of the polymer chain.

-Ph1-SO₂-Ph2-O— (A)

(Ph1 and Ph2 are each independently a phenylene group which may have a substituent.)

The phenylene groups represented by Ph1 and Ph2 may be each independently a p-phenylene group, an m-phenylene group or an o-phenylene group. In the present embodiment, a p-phenylene group is preferable.

The aforementioned phenylene group which may have a substituent means a phenylene group having a substituent or a phenylene group having no substituent.

Examples of the substituent that the phenylene group may have include an alkyl group, an aryl group and a halogen atom.

The alkyl group as a substituent that the phenylene group may have is preferably an alkyl group having 1 to 10 carbon atoms. Examples of the alkyl group having 1 to carbon atoms include a methyl group, an ethyl group, an n-propyl group, an isopropyl group, an n-butyl group, an isobutyl group, a sec-butyl group, a tert-butyl group, an n-pentyl group, an n-hexyl group, an n-heptyl group, a 2-ethylhexyl group, an n-octyl group and an n-decyl group.

The aryl group as a substituent that the phenylene group may have is preferably an aryl group having 6 to 20 carbon atoms. Examples of the aryl group having 6 to 20 carbon atoms include a phenyl group, an o-tolyl group, an m-tolyl group, a p-tolyl group, a 1-naphthyl group and a 2-naphthyl group.

Examples of the halogen atom as a substituent that the phenylene group may have include a fluorine atom, a chlorine atom, a bromine atom and an iodine atom.

In the case where the hydrogen atom in the phenylene group is substituted with these functional groups, the number thereof is each independently preferably 2 or less, and more preferably 1, for each of the phenylene groups.

In the present embodiment, the amino group-containing aromatic polysulfone only needs to have an amino group at least at one end of the polymer chain, but from the viewpoint of exhibiting higher adhesiveness, it is preferable to have amino groups at both ends of the polymer chain.

In the present embodiment, the amino group-containing aromatic polysulfone is a polymer compound substantially composed of a repeating unit represented by the general formula (A) and having an amino group (—NH₂) at least at one end of the polymer chain.

In the present specification, the expression "substantially" means that a structure caused by a raw material monomer or a structure caused by impurities contained in the raw material monomer or the like may be slightly contained. The expression "slightly contained" as used herein means to contain 0 to 40% by mass, preferably 0 to 30% by mass, more preferably 0 to 20% by mass, still more preferably 0 to 10% by mass, and particularly preferably 0 to 5% by mass, with respect to the total amount of all the repeating units constituting the amino group-containing aromatic polysulfone.

Further, in another aspect, the expression "substantially" as used herein means to contain 60 mol % or more and 100 mol % or less, preferably 70 mol % or more and 100 mol % or less, more preferably 80 mol % or more and 100 mol % or less, still more preferably 90 mol % or more and 100 mol % or less, particularly preferably 95 mol % or more and 100 mol % or less, and extremely preferably 100 mol % of repeating units represented by the general formula (A) with respect to the total amount of all the repeating units constituting the amino group-containing aromatic polysulfone.

In another aspect, in the present embodiment, the aforementioned general formula (A) may be the following general formula (A)-1. It should be noted that when the general formula (A)-1 is adopted, the descriptions related to the aforementioned general formula (A) are applied to the general formula (A)-1.

(-Ph1-SO₂-Ph2-O—)ₙ(-Ph3-SO₂-Ph4-O-Ph5-Y-Ph6-O—)ₘ (A)-1

(Ph1 to Ph6 are each independently a phenylene group which may have a substituent; Y is a single bond or a linear, branched or cyclic alkylene group having 1 to 5 carbon atoms; n is an integer of 1 or more and 2,000 or less, and m is an integer of 0 or more and 2,000 or less.)

In the general formula (A)-1, the description related to the phenylene group which may have a substituent represented by Ph1 to Ph6 is the same as the description of Ph1 and Ph2 in the aforementioned general formula (A).

In the general formula (A)-1, Y is a single bond or a linear, branched or cyclic alkylene group having 1 to 5 carbon atoms. Specific examples of the linear alkylene group include a methylene group [—CH₂—], an ethylene group [—(CH₂)₂—], a trimethylene group [—(CH₂)₃—], a tetramethylene group [—(CH₂)₄-] and a pentamethylene group [—(CH₂)₅—]. Specific examples of the branched alkylene group include —CH(CH₃)—, —CH(CH₂CH₃)— and —C(CH₃)₂—. Specific examples of the cyclic alkylene group include a group obtained by removing two hydrogen atoms from cyclohexane. In the present embodiment, a branched alkylene group is preferable.

In the general formula (A)-1, n is an integer of 1 or more and 2,000 or less, and m is an integer of 0 or more and 2,000 or less. m may be 0 or an integer of 1 or more.

In the present embodiment, the amino group-containing aromatic polysulfone described above has an amino group at the end of the polymer chain. In the structure of the polymer chain end, an amino group (—NH₂) may be directly bonded, or an amino group may be bonded via a phenylene group.

In the present embodiment, the amino group-containing aromatic polysulfone is preferably a polymer compound composed of a repeating unit represented by the aforementioned general formula (A) and having an amino group at least at one end of the polymer chain, or, in another aspect, is a polymer compound composed of a repeating unit represented by the aforementioned general formula (A)-1 and having an amino group at least at one end of the polymer chain, and is more preferably a polymer compound composed of a repeating unit represented by the aforementioned general formula (A) and having an amino group at least at one end of the polymer chain.

In one aspect, the aromatic polysulfone of the present embodiment preferably contains the above amino group-containing aromatic polysulfone in an amount of 60% by mass or more and 100% by mass or less, more preferably 70% by mass or more and 100% by mass or less, still more preferably 80% by mass or more and 100% by mass or less, particularly preferably 90% by mass or more and 100% by mass or less, and extremely preferably 95% by mass or more and 100% by mass or less with respect to the total mass of the aromatic polysulfone of the present embodiment, and is most preferably composed only of the above amino group-containing aromatic polysulfone.

Examples of components other than the above amino group-containing aromatic polysulfone that may be contained in the aromatic polysulfone of the present embodiment include a by-product (for example, . . . ) generated at the time of polymerizing the amino group-containing aromatic polysulfone, and an aromatic polysulfone composed of a repeating unit represented by the above general formula (A) and having no amino group at the end of the polymer chain (for example, an aromatic polysulfone composed of a repeating unit represented by the above general formula (A), and in which terminal modification with an amino group is incomplete).

That is, in one aspect, the aromatic polysulfone of the present embodiment contains, the above amino group-containing aromatic polysulfone, and may further contain at least one component selected from the group consisting of a by-product generated at the time of polymerizing the amino group-containing aromatic polysulfone, and an aromatic polysulfone composed of a repeating unit represented by the above general formula (A) and having no amino group at the end of the polymer chain, wherein the content of the amino group-containing aromatic polysulfone is 60% by mass or more and 100% by mass or less, preferably 70% by mass or more and 100% by mass or less, more preferably 80% by mass or more and 100% by mass or less, still more preferably 90% by mass or more and 100% by mass or less, and particularly preferably 95% by mass or more and 100% by mass or less, with respect to the total mass of the aromatic polysulfone.

(Absolute Molecular Weight)

The weight average absolute molecular weight (Mw) of the aromatic polysulfone of the present embodiment is 20,000 g/mol or more, preferably 22,000 g/mol or more, more preferably 24,000 g/mol or more, and particularly preferably 26,000 g/mol or more.

In the present embodiment, as a result of the weight average absolute molecular weight (Mw) of the aromatic polysulfone being equal to or more than the above lower limit value, the viscosity is improved and high adhesiveness can be exhibited.

In the present embodiment, the upper limit value of the weight average absolute molecular weight (Mw) of the aromatic polysulfone is not particularly limited. As an example, 200,000 g/mol or less, 150,000 g/mol or less, or 100,000 g/mol or less can be mentioned.

The above upper limit value and lower limit value can be arbitrarily combined.

In one aspect, the weight average absolute molecular weight (Mw) of the aromatic polysulfone is preferably 20,000 g/mol or more and 200,000 g/mol or less, more preferably 22,000 g/mol or more and 150,000 g/mol or less, still more preferably 24,000 g/mol or more and 150,000 g/mol or less, particularly preferably 26,000 g/mol or more and 100,000 g/mol or less, and extremely preferably 28,000 g/mol or more and 100,000 g/mol or less.

The weight average absolute molecular weight can be calculated from detection using, for example, a differential refractometer and a multi-angle light scattering photometer (may be abbreviated as MALS) according to the measurement conditions described in the examples below.

(Reduced Viscosity)

The reduced viscosity (unit: dL/g) of the aromatic polysulfone of the present embodiment is 0.30 or more, preferably 0.32 or more, and more preferably 0.35 or more. As the reduced viscosity increases, the aromatic polysulfone can exhibit higher adhesiveness.

The upper limit value of the reduced viscosity is not particularly limited, and examples thereof include 0.80 or less, 0.75 or less, and 0.7 or less. In the present embodiment, the reduced viscosity can be measured (at 25° C.) by the method described in the examples below using, for example, an Ostwald type viscosity tube. For example, the reduced viscosity (dL/g) of the aromatic polysulfone can be obtained by measuring the viscosity ($\eta$) of the aromatic polysulfone solution and the viscosity ($\eta 0$) of the solvent with an Ostwald type viscosity tube (at 25° C.), respectively; determining the specific viscosity (($\eta - \eta 0$)/$\eta 0$) from the viscosity of the solution ($\eta 0$) and the viscosity ($\eta 0$) of the solvent; and dividing the specific viscosity by the concentration of the solution (about 1 g/dL). The above upper limit value and lower limit value of the reduced viscosity can be arbitrarily combined.

In one aspect, the reduced viscosity of the aromatic polysulfone of the present embodiment is preferably 0.30 or more and 0.80 or less, more preferably 0.32 or more and 0.75 or less, and particularly preferably 0.35 or more and 0.7 or less.

(Glass Transition Temperature)

In the present embodiment, the glass transition temperature (Tg) of the aromatic polysulfone is preferably 220° C. or higher, more preferably 221° C. or higher, and particularly preferably 223° C. or higher.

The upper limit value of the glass transition temperature is not particularly limited, and examples thereof include 250° C. or lower, 240° C. or lower, and 230° C. or lower.

The upper limit value and the lower limit value of the above glass transition temperature can be arbitrarily combined.

In one aspect, the glass transition temperature of the aromatic polysulfone is preferably 220° C. or higher and 250° C. or lower, more preferably 221° C. or higher and 240° C. or lower, particularly preferably 223° C. or higher and 230° C. or lower, and extremely preferably 223° C. or higher and 228° C. or lower.

The glass transition temperature can be measured, for example, by a method according to JIS-K7121.

In the present embodiment, high adhesiveness can be exhibited when the glass transition temperature is equal to or higher than the above lower limit value.

(Amount of Amino Group Ends)

In the aromatic polysulfone of the present embodiment, the number of amino groups at the end of the polymer chain is preferably 0.4 or more, more preferably 1.0 or more, and particularly preferably 1.5 or more, per 100 repeating units represented by the aforementioned formula (A). The upper limit value of the amino group is not particularly limited, and examples thereof include 10 or less, 8 or less, and 4 or less per 100 repeating units represented by the aforementioned formula (A).

In one aspect, in the aromatic polysulfone of the present embodiment, the number of amino groups at the end of the polymer chain is preferably 0.4 or more and 10 or less, more preferably 1.0 or more and 8 or less, particularly preferably 1.5 or more and 4 or less, and extremely preferably 2 or more and less than 3.0, per 100 repeating units represented by the aforementioned formula (A).

When the amount of amino group ends per 100 repeating units represented by the aforementioned formula (A) is equal to or more than the above lower limit value, since the binding site to an adherend increases, high adhesiveness can be exhibited.

The number of amino groups at the end of the polymer chain of the aromatic polysulfone can be measured by an NMR method.

More specifically, the aromatic polysulfone is dissolved in a solvent such as deuterated dimethyl sulfoxide, and in $^1$H-NMR measurement, the peak areas of two protons bonded to the carbon adjacent to the aromatic carbon substituted with an amino group ($1H_{NH2}$) and the peak areas of four protons adjacent to the aromatic carbon derived from the repeating structure of the aromatic polysulfone ($1H_{PES}$) are observed.

Based on these peak areas, the amount of ends having an amino group per 100 repeating units represented by the aforementioned formula (A) can be calculated by the following formula.

[Amount of ends having an amino group(ends/100 repeating units)]=[peak area of $1H_{NH2}$ when peak area of $1H_{PES}$ is 100]×2

Specific examples of the aromatic polysulfone according to an embodiment of the present invention will be described below. In the specific examples shown below, n is a natural number (an integer of 1 or more and 2,000 or less), and m is an integer of 1 or more and 2,000 or less.

preferably 15% by mass or more and less than 100% by mass, and particularly preferably 18% by mass or more and less than 100% by mass, with respect to the total mass of the aromatic polysulfone composition.

In the aromatic polysulfone composition, the content of PES2 is preferably more than 0% by mass and 90% by mass or less with respect to the total mass of the aromatic polysulfone composition.

Resin Other than Aromatic Polysulfone

The aromatic polysulfone composition of the present embodiment may further contain a resin other than the above aromatic polysulfones (PES1, PES2).

Examples of resins other than the aromatic polysulfones include polyamides, polyesters, polyphenylene sulfides, polycarbonates, polyphenylene ethers, aromatic polyketones, polyetherimides, phenol resins, epoxy resins, poly-

[Chemical Formula 1]

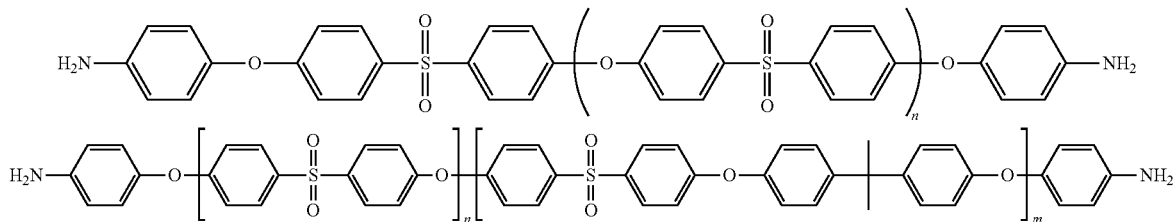

<Aromatic Polysulfone Composition>

An aromatic polysulfone composition according to an embodiment of the present invention includes the aforementioned aromatic polysulfone according to an embodiment of the present invention (hereinafter referred to as "PES1") and an aromatic polysulfone different from this (hereinafter referred to as "PES2").

Examples of the PES2 include a resin having a repeating unit represented by the aforementioned general formula (A) or the aforementioned general formula (A)-1 and in which at least one end of the polymer chain is a chlorine atom (PES2-2), and a resin having a repeating unit represented by the aforementioned general formula (A) or the aforementioned general formula (A)-1 and in which at least one end of the polymer chain is a hydroxyl group (PES2-3). In the present embodiment, the above PES2-2 is preferable as the PES2.

Further, in the aromatic polysulfone composition of the present embodiment, PES2-2 or PES2-3 preferably has an absolute molecular weight of 20,000 or more and 200,000 or less.

In the aromatic polysulfone composition, the content of PES1 is preferably 10% by mass or more and less than 100% by mass, more preferably 20% by mass or more and less than 100% by mass, still more preferably 25% by mass or more and less than 100% by mass, and particularly preferably 30% by mass or more and less than 100% by mass with respect to the total mass of the aromatic polysulfone composition. Adhesiveness is further improved when the content of PES1 is equal to or more than the above lower limit value.

In another aspect, in the aromatic polysulfone composition of the present embodiment, the content of the amino group-containing aromatic polysulfone is preferably 6% by mass or more and less than 100% by mass, more preferably 12% by mass or more and less than 100% by mass, still more imide resins, and modified products thereof. In the present embodiment, among the above resins, an epoxy resin is preferable.

The content of the resin other than the aromatic polysulfone is preferably from 0 to 50% by mass with respect to the total mass of the aromatic polysulfone composition.

Organic Solvent

The aromatic polysulfone composition of the present embodiment may further contain an organic solvent. It should be noted that the organic solvent may be added later when preparing the aromatic polysulfone composition, or may be included in advance in the aromatic polysulfone. As such an organic solvent, the same organic solvents as those exemplified in the production method of the present embodiment described later can be used.

The content of the organic solvent is preferably from 0 to 95% by mass with respect to the total mass of the aromatic polysulfone composition of the present embodiment.

Other Components

The aromatic polysulfone composition of the present embodiment can contain various materials, as necessary, as long as the effects of the present invention are not impaired. Examples of such materials include coloring components, lubricants, various surfactants, antioxidants, heat stabilizers, various other stabilizers, ultraviolet absorbers and antistatic agents.

The content of other components is preferably from 0 to 5% by mass with respect to the total mass of the aromatic polysulfone composition of the present embodiment.

<Method for Producing Aromatic Polysulfone>

A method for producing an aromatic polysulfone according to an embodiment of the present invention is a method for producing an aromatic polysulfone which includes allowing a polycondensation reaction between a phenoxy end or phenolate end generated as a by-product and a halogen end by condensing an aromatic halogenosulfone compound with an amino compound (polycondensation step), wherein the aforementioned step includes: mixing the aforementioned aromatic halogenosulfone compound and the aforementioned amino compound such that a molar ratio of an amino group with respect to a halogen atom at an end of the aforementioned aromatic halogenosulfone compound is 0.3 or more and less than 1.0; and reacting while heating at a temperature higher than 180° C.

The aromatic polysulfone produced by the production method of the present embodiment contains an amino group-containing aromatic polysulfone substantially composed of a repeating unit represented by the aforementioned general formula (A) and having an amino group at least at one end of the polymer chain. The aromatic polysulfone produced by the production method of the present embodiment preferably contains 60% by mass or more and 100% by mass or less of the amino group-containing aromatic polysulfone with respect to the total mass of the aromatic polysulfone as described above, and preferably composed only of the amino group-containing aromatic polysulfone.

As a component other than the amino group-containing aromatic polysulfone that may be contained in the aromatic polysulfone produced by the production method of the present embodiment, a by-product (for example, potassium chloride) generated at the time of polymerizing the amino group-containing aromatic polysulfone, an aromatic polysulfone composed of a repeating unit represented by the above general formula (A) and having no amino group at the end of the polymer chain (that is, an aromatic polysulfone in which terminal modification with an amino group is incomplete) or the like can be mentioned. For this reason, in effect, the method for producing an aromatic polysulfone of the present embodiment may be a method for producing an amino group-containing aromatic polysulfone.

In one aspect, the aromatic polysulfone produced by the production method of the present embodiment is an aromatic polysulfone which includes an amino group-containing aromatic polysulfone, and may further include at least one component selected from the group consisting of a by-product generated at the time of polymerizing the amino group-containing aromatic polysulfone, and an aromatic polysulfone composed of a repeating unit represented by the above general formula (A) and having no amino group at the end of the polymer chain (that is, an aromatic polysulfone in which terminal modification with an amino group is incomplete), wherein the content of the aforementioned amino group-containing aromatic polysulfone is 60% by mass or more and 100% by mass or less with respect to the total mass of the aforementioned aromatic polysulfone.

A step of polycondensing a phenoxy end or phenolate end generated as a by-product and a halogen end by condensing an aromatic halogenosulfone compound and an amino compound (hereinafter referred to as "polycondensation step") will be described.

The step of polycondensing a phenoxy end or phenolate end generated as a by-product and a halogen end by condensing an aromatic halogenosulfone compound and an amino compound (polycondensation reaction) is preferably carried out using an alkali metal salt of carbonic acid as a base, more preferably carried out in an organic solvent serving as a polymerization solvent, and particularly preferably carried out using an alkali metal salt of carbonic acid as a base and in an organic solvent.

The alkali metal salt of carbonic acid may be an alkali carbonate which is a normal salt, that is, an alkali metal carbonate, or may be an alkali bicarbonate which is an acid salt, that is, an alkali hydrogencarbonate or an alkali metal hydrogencarbonate. Further, it may be a mixture of the alkali carbonate and alkali bicarbonate described above.

As the alkali carbonate, sodium carbonate, potassium carbonate and the like are preferable.

As the alkali bicarbonate, sodium bicarbonate (also referred to as sodium hydrogen carbonate), potassium bicarbonate (also referred to as potassium hydrogen carbonate) and the like are preferable.

The organic solvent is preferably a polar organic solvent.

Examples of the polar organic solvent include dimethylsulfoxide, 1-methyl-2-pyrrolidone (may be abbreviated as NMP), sulfolane (also referred to as 1,1-dioxothiolane), 1,3-dimethyl-2-imidazolidinone, 1,3-diethyl-2-imidazolidinone, dimethyl sulfone, diethyl sulfone, diisopropyl sulfone and diphenyl sulfone.

In the present embodiment, the aromatic halogenosulfone compound and the amino compound are mixed so that the molar ratio of the amino group with respect to the halogen atom at the end of the aromatic halogenosulfone compound is 0.3 or more and less than 1.0. The molar ratio is preferably 0.4 or more and 0.9 or less, and more preferably 0.5 or more and 0.8 or less. When the amount of the amino compound mixed is in the above range, the residual amounts of phenoxy end or phenolate end and halogen end generated as by-products are small, and the weight average absolute molecular weight and the reduced viscosity can be controlled within the range of the present invention described above.

The amount of the alkali metal salt of carbonic acid used is preferably such that the molar ratio of the alkali metal with respect to the halogen atom at the end of the aromatic halogenosulfone compound is 0.9 or more and 1.2 or less, and more preferably 0.95 or more and 1.15 or less. The more the amount of the alkali metal salt of carbonic acid used, the faster the intended polycondensation proceeds. However, when the amount of the alkali metal salt of carbonic acid used becomes excessive, the number of phenoxy ends or phenolate ends generated as by-products increases. Therefore, if the amount of the alkali metal salt of carbonic acid used is within the above range, the degree of polymerization of the obtained aromatic polysulfone increases, and as a result, there is a tendency that the reduced viscosity of the aromatic polysulfone increases and the weight average absolute molecular weight increases.

In the method for producing an aromatic polysulfone of the present embodiment, the polycondensation step involves dissolving an aromatic halogenosulfone compound and an amino compound in a polar organic solvent, and adding an alkali metal salt of carbonic acid to the obtained solution to polycondense the aromatic halogenosulfone compound and the amino compound. Thereafter, an unreacted alkali metal salt of carbonic acid, an alkali halide generated as a by-product and the polar organic solvent are removed from the reaction mixture obtained in the polycondensation step to obtain an aromatic polysulfone.

In the present embodiment, the heating temperature at the time of polycondensation is set to a temperature higher than 180° C., preferably 200° C. or higher, and more preferably 210° C. or higher and 400° C. or lower. If the heating temperature during polycondensation is higher than 180° C., the intended polycondensation proceeds rapidly. For this reason, the degree of polymerization of the obtained aromatic polysulfone increases, and as a result, the reduced viscosity of the aromatic polysulfone increases and the weight average absolute molecular weight increases.

In the present embodiment, for example, when producing an amino group-containing aromatic polysulfone composed of a repeating unit represented by the aforementioned general formula (A)-1, in addition to the aromatic halogenosulfone compound and the amino compound described above, for example, bisphenol A ($C_{15}H_{16}O_2$), bisphenol S ($C_{12}H_{10}O_4S$), biphenol and the like may be reacted.

In the present embodiment, when producing an amino group-containing aromatic polysulfone composed of the repeating unit represented by the aforementioned general formula (A)-1, in addition to the aromatic halogenosulfone compound and the amino compound described above, it is preferable to react at least one selected from the group consisting of bisphenol A ($C_{15}H_{16}O_2$), bisphenol S ($C_{12}H_{10}O_4S$) and biphenol, and it is more preferable to react bisphenol A and bisphenol S.

Further, in the polycondensation step, the temperature is gradually raised while removing water generated as a by-product, and after reaching the reflux temperature of the polar organic solvent, it is preferable to further keep the temperature for 1 hour to 50 hours, and it is more preferable to keep the temperature for 2 hours to 30 hours. The longer the polycondensation time, the more the intended polycondensation proceeds, so that the degree of polymerization of the obtained aromatic polysulfone increases. As a result, there is a tendency that the reduced viscosity of the aromatic polysulfone increases and the absolute molecular weight increases.

An aromatic polysulfone can be obtained by removing the unreacted alkali metal salt of carbonic acid and the alkali halide and polar organic solvent generated as by-products from the reaction mixture obtained in the polycondensation step. The unreacted alkali metal salt of carbonic acid and the alkali halide generated as a by-product may be removed by filtration, extraction, centrifugation, or the like before removing the polar organic solvent. The removal of the polar organic solvent may be carried out by distilling off the polar organic solvent, or may be carried out by mixing with a poor solvent for the aromatic polysulfone to precipitate the aromatic polysulfone, followed by separation by filtration, centrifugation or the like. Since the unreacted alkali metal salt of carbonic acid and the alkali halide and polar organic solvent generated as by-products can be removed simultaneously, it is preferable to precipitate the aromatic polysulfone by mixing a poor solvent for the aromatic polysulfone that can dissolve the unreacted alkali metal salt of carbonic acid and the alkali halide generated as a by-product, followed by separation by filtration, centrifugation or the like.

Examples of the poor solvent for the aromatic polysulfone include methanol, ethanol, 2-propanol, hexane, heptane and water, and water is preferable because it can be easily removed.

Each material used in the method for producing an aromatic polysulfone according to the present embodiment will be described.

Aromatic Halogenosulfone Compound

Examples of the aromatic halogenosulfone compound according to the present embodiment include the following compound (4) or (5).

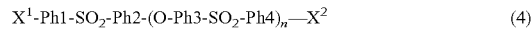

[In formula (4), $X^1$ and $X^2$ each independently represent a halogen atom; Ph1 and Ph2 are the same as PM and Ph2 defined in the aforementioned formula (A); Ph3 and Ph4 are phenylene groups which may have a substituent; and n is an integer of 0 or more and 2,000 or less.]

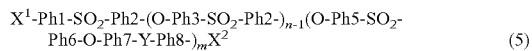

[In formula (5), $X^1$ and $X^2$ each independently represent a halogen atom; Ph1 to Ph8 each independently represent a phenylene group which may have a substituent; Y represents a single bond or a linear, branched or cyclic alkylene group having 1 to 5 carbon atoms; n is an integer of 1 or more and 2,000 or less, and m is an integer of 0 or more and 2,000 or less.]

In the compound (4) or (5), the explanation for the phenylene group which may have a substituent represented by Ph3 to Ph8 is the same as the explanation for the phenylene group which may have a substituent represented by Ph1 and Ph2.

In the compound (5), the explanation for Y, n, m is the same as the explanation for Y, n, m in the aforementioned general formula (A)-1.

Examples of the compound (4) include bis(4-chlorophenyl) sulfone, 4-chlorophenyl-3',4'-dichlorophenylsulfone, and a compound obtained by polymerizing these.

Moreover, aromatic halogenosulfone compounds can be produced by a known method, and, for example, commercially available products such as "SUMIKAEXCEL PES 3600P" and "SUMIKAEXCEL PES 4100P" manufactured by Sumitomo Chemical Co., Ltd. can also be used.

Amino Compound

Examples of the amino compound according to the present embodiment include 4-aminophenol, 3-aminophenol, 2,4-diaminophenol, 2,5-diaminophenol, 3-aminopropanol and 4-(2-aminoethyl) phenol, and among them, 4-aminophenol and 3-aminophenol are preferable.

Another aspect of the aromatic polysulfone according to an embodiment of the present invention is an aromatic polysulfone including, an amino group-containing aromatic polysulfone composed of a repeating unit represented by the above general formula (A) and having an amino group at least at one end of the polymer chain; wherein in the aforementioned amino group-containing aromatic polysulfone, the content of the repeating unit represented by the aforementioned general formula (A) is 60 mol % or more and 100 mol % or less, preferably 70 mol % or more and 100 mol % or less, more preferably 80 mol % or more and 100 mol % or less, still more preferably 90 mol % or more and 100 mol % or less, particularly preferably 95 mol % or more and 100 mol % or less, and extremely preferably 100 mol % with respect to the total amount of all the repeating units constituting the aforementioned amino group-containing aromatic polysulfone;

the number of amino groups at the end of the aforementioned polymer chain is 0.4 or more and 10 or less, preferably 1.0 or more and 8 or less, more preferably 1.5 or more and 4 or less, and particularly preferably 2 or more and less than 3.0 per 100 repeating units represented by the aforementioned formula (A);

the weight average absolute molecular weight (Mw) is 20,000 g/mol or more and 200,000 g/mol or less, preferably 22,000 g/mol or more and 150,000 g/mol or less, more preferably 24,000 g/mol or more and 150,000 g/mol or less, still more preferably 26,000 g/mol or more and 100,000 g/mol or less, and particularly preferably 28,000 g/mol or more and 100,000 g/mol or less;

the reduced viscosity (unit: dL/g) is 0.30 or more and 0.80 or less, preferably 0.32 or more and 0.75 or less, and more preferably 0.35 or more and 0.7 or less; and the glass transition temperature is 220° C. or higher and 250° C. or lower, preferably 221° C. or higher and 240° C. or lower, more preferably 223° C. or higher and 230° C. or lower, and particularly preferably 223° C. or higher and 224° C. or lower.

Another aspect of the aromatic polysulfone according to an embodiment of the present invention is an aromatic polysulfone including, an amino group-containing aromatic polysulfone composed of a repeating unit represented by the above general formula (A) and having an amino group at least one end of the polymer chain; wherein in the aforementioned amino group-containing aromatic polysulfone, the content of the repeating unit represented by the aforementioned general formula (A) is 60 mol % or more and 100 mol % or less, preferably 70 mol % or more and 100 mol % or less, more preferably 80 mol % or more and 100 mol % or less, still more preferably 90 mol % or more and 100 mol % or less, particularly preferably 95 mol % or more and 100 mol % or less, and extremely preferably 100 mol % with respect to the total amount of all the repeating units constituting the aforementioned amino group-containing aromatic polysulfone;

the number of amino groups at the end of the aforementioned polymer chain is 2 or more and less than 3.0 per 100 repeating units represented by the aforementioned formula (A);

the weight average absolute molecular weight (Mw) is 28,000 g/mol or more and 100,000 g/mol or less;

the reduced viscosity (unit: dL/g) is 0.35 or more and 0.7 or less; and the glass transition temperature is 223° C. or higher and 228° C. or lower.

The aforementioned aromatic polysulfone may have a peel strength of 8 N/cm$^2$ or more and 20 N/cm$^2$ or less, preferably 10 N/cm$^2$ or more and 15 N/cm$^2$ or less, more preferably 11 N/cm$^2$ or more and 15 N/cm$^2$ or less when a peel strength test is performed by the method described in Examples below.

The aforementioned aromatic polysulfone may further contain at least one component selected from the group consisting of a by-product generated when polymerizing the amino group-containing aromatic polysulfone, and an aromatic polysulfone composed of a repeating unit represented by the above general formula (A) and having no amino group at the end of the polymer chain.

Another aspect of the aromatic polysulfone composition according to an embodiment of the present invention is an aromatic polysulfone composition including an aromatic polysulfone, another different aromatic polysulfone, and other components if desired, wherein the aforementioned aromatic polysulfone is an aromatic polysulfone (PES1) including the above amino group-containing aromatic polysulfone according to an embodiment of the present invention;

an aromatic polysulfone different from the above aromatic polysulfone includes at least one resin (PES2) selected from the group consisting of a resin having a repeating unit represented by the above general formula (A) or the above general formula (A)-1 and in which at least one end of the polymer chain is a chlorine atom (PES2-2), and a resin having a repeating unit represented by the above general formula (A) or the above general formula (A)-1 and in which at least one end of the polymer chain is a hydroxyl group (PES2-3), the aforementioned other component is at least one selected from the group consisting of resins other than the aforementioned aromatic polysulfone, organic solvents, coloring components, lubricants, various surfactants, antioxidants, heat stabilizers, various other stabilizers, ultraviolet absorbers and antistatic agents; and the content of the aforementioned aromatic polysulfone (PEST) is 10% by mass or more and less than 100% by mass, preferably 20% by mass or more and less than 100% by mass, more preferably 25% by mass or more and less than 100% by mass, and particularly preferably 30% by mass or more and less than 100% by mass, with respect to the total mass of the aforementioned aromatic polysulfone composition.

Another aspect of the method for producing an aromatic polysulfone according to an embodiment of the present invention is a method for producing an aromatic polysulfone, including:

allowing a polycondensation reaction between a phenoxy end or phenolate end generated as a by-product and a halogen end by condensing an aromatic halogenosulfone compound and an amino compound; and removing an unreacted alkali metal salt of carbonic acid, an alkali halide generated as a by-product and a polar organic solvent from the reaction mixture obtained by the aforementioned polymerization reaction; wherein the aforementioned polycondensation reaction includes steps of: mixing the aforementioned aromatic halogenosulfone compound and the aforementioned amino compound such that a molar ratio of an amino group of the aforementioned amino compound with respect to a halogen atom at the end of the aforementioned aromatic halogenosulfone compound is 0.3 or more and less than 1.0, preferably 0.4 or more and 0.9 or less, and more preferably 0.5 or more and 0.8 or less; and reacting while heating at a temperature higher than 180° C., preferably 200° C. or higher, and more preferably 210° C. or higher and 400° C. or lower, and the time of the aforementioned polycondensation reaction is 1 hour or more and 50 hours or less, and preferably 2 hours or more and 30 hours or less.

EXAMPLES

Hereinafter, the present invention will be described more specifically with reference to examples, but the present invention is not limited to the following examples.

<Method for Quantifying Amino Terminals>

For the amount of ends having an amino group of an aromatic polysulfone, two protons ($1H_{NH2}$) bonded to the carbon adjacent to the aromatic carbon substituted with an amino group from 6.6 to 6.7 ppm and four protons ($1H_{PES}$) adjacent to the aromatic carbon derived from the repeating structure of the aromatic polysulfone from 7.9 to 8.1 ppm were observed by 400 MHz $^1$H-NMR in a deuterated DMSO solvent at a measurement temperature of 50° C. and the number of integrations of 64 times, and the amount of ends having an amino group per 100 repeating units represented by the aforementioned formula (A) was calculated by the following formula.

[Amount of ends having an amino group(ends/100 repeating units)]=[peak area of $1HN_{NH2}$ when peak area of 1Hp-s is 100]×2

[Measuring Apparatus]
NMR apparatus: Varian NMR System PS400WB
Magnetic field strength: 9.4 T (400 MHz)
Probe: Varian 400 DB AutoX WB Probe (5 mm)
(Measurement Conditions)
Measured nucleus: 1H
Measurement method: single pulse method
Measurement temperature: 50° C.
Deuterated solvent: d6-DMSO (containing TMS)
Waiting time: 10 sec
Pulse irradiation time: 11.9 μsec (90° C. pulse)
Number of integrations: 64 times
External standard: TMS (0 ppm)

<Measurement of Glass Transition Temperature of Aromatic Polysulfone>

The glass transition temperature was calculated by a method according to JIS-K7121 using a differential scanning calorimeter (DSC-50 manufactured by Shimadzu Corporation). About 10 mg of the sample was weighed, and the temperature was raised to 400° C. at a rate of temperature increase of 10° C./min, then cooled to 50° C. and raised again to 400° C. at a rate of temperature increase of 10° C./min. From the DSC chart obtained by the second temperature increase, the glass transition temperature was calculated by the method in accordance with JIS-K 7121.

<Measurement of Mn and Mw of aromatic polysulfone, and calculation of Mw/Mn>

The weight average absolute molecular weight (Mw) (unit: g/mol), number average absolute molecular weight (Mn) and polydispersity (Mw/Mn) of the aromatic polysulfone were determined by GPC (gel permeation chromatography) measurement. It should be noted that both Mn and Mw values were measured twice, and the average values thereof were determined as Mn and Mw, respectively, to obtain the average value of Mw/Mn.

[Measurement Conditions]
Sample: 0.002 g of aromatic polysulfone was added to 1 mL of an N,N-dimethylformamide solution containing 10 mM lithium bromide.
Sample injection volume: 100 μL.
Column (stationary phase): Two columns of "TSKgel GMHHR-H" (7.8 mmφ×300 mm) manufactured by Tosoh Corporation were connected in series.
Column temperature: 40° C.
Eluent (mobile phase): N,N-dimethylformamide containing 10 mM lithium bromide.
Eluent flow rate: 0.8 mL/min.
Detector: differential refractometer (RI)+multi-angle light scattering photometer (MALS).
Standard reagent: polystyrene.
Molecular weight calculation method: The absolute molecular weight was calculated from a multi-angle light scattering photometer (MALS).

<Measurement of Reduced Viscosity of Aromatic Polysulfone>

About 1 g of an aromatic polysulfone was dissolved in N,N-dimethylformamide to adjust the volume to 1 dL, and the viscosity (η) of this solution was measured at 25° C. using an Ostwald type viscosity tube. Further, the viscosity (η0) of N,N-dimethylformamide as a solvent was measured at 25° C. using an Ostwald type viscosity tube. The specific viscosity ((η−η0)/η0) was obtained from the viscosity (η) of the aforementioned solution and the viscosity (η0) of the aforementioned solvent, and the reduced viscosity (dL/g) of the aromatic polysulfone was obtained by dividing the specific viscosity by the concentration of the aforementioned solution (about 1 g/dL).

<Peel Strength Test> parts by mass of an aromatic polysulfone and 85 parts by mass of NMP were charged into a heating vessel and stirred at 60° C. for 2 hours to obtain a pale yellow aromatic polysulfone solution. The resulting solution was applied to an electrolytic copper foil having a thickness of 18 μm using a film applicator, and dried at 60° C. using a high temperature hot air dryer to form a coating film. This coating film was heat-treated at 250° C. while causing nitrogen to flow, thereby forming a resin layer on the copper foil. An electrolytic copper foil having a thickness of 18 μm was superposed on the copper foil having the resin layer to form a three layer structure composed of the copper foil/resin layer/copper foil, followed by pressure bonding at 3 MPa and 250° C. for 30 minutes to obtain a laminate. The resulting laminate was pulled with an Autograph at a tensile speed of 5 mm/min to obtain a peel strength in an atmosphere at 23° C. and a humidity of 50%.

<Production of Aromatic Polysulfone>

Example 1

1.22 g of aminophenol, 1.24 g of potassium carbonate and 180 g of N-methyl-2-pyrrolidone were mixed in a polymerization vessel equipped with a stirrer, a nitrogen inlet tube, a thermometer, and a condenser attached with a receiver at the tip, and after raising the temperature to 100° C., 120 g of a polyethersulfone (SUMIKAEXCEL PES3600P manufactured by Sumitomo Chemical Co., Ltd.) was added thereto. The amount of the aminophenol with respect to the amount of the chloro end of the polyethersulfone was 0.7 (molar ratio), and the molar ratio of the alkali metal atom with respect to the chloro end of the polyethersulfone was 1.12. After the polyethersulfone was dissolved, the resulting solution was heated at 220° C. (internal temperature: about 200° C.) and reacted for 10 hours. Subsequently, the obtained reaction mixture solution was diluted with NMP and cooled to room temperature to precipitate unreacted potassium carbonate and potassium chloride generated as a by-product. The above-mentioned solution was added dropwise into water to precipitate an aromatic polysulfone, and unnecessary NMP was removed by filtration, thereby obtaining a precipitate.

The obtained precipitate was carefully washed repeatedly with water and dried by heating at 150° C. to obtain an amino group-containing aromatic polysulfone having an amino group at the end. Table 1 shows the amount of amino group ends, Tg, weight average absolute molecular weight (Mw), polydispersity (Mw/Mn), reduced viscosity and peel strength. In the following Table 1, the number of amino groups at the end of the polymer chain per 100 repeating units represented by the formula (A) is described as "amount of amino group ends".

Comparative Example 1

1.75 g of aminophenol, 1.33 g of potassium carbonate and 180 g of N-methyl-2-pyrrolidone were mixed in a polymerization vessel equipped with a stirrer, a nitrogen inlet tube, a thermometer, and a condenser attached with a receiver at the tip, and after raising the temperature to 100° C., 120 g of a polyethersulfone (SUMIKAEXCEL PES3600P manufactured by Sumitomo Chemical Co., Ltd.) was added thereto. The amount of the aminophenol with respect to the amount of the chloro end of the polyethersulfone was 1 (molar ratio), and the molar ratio of the alkali metal atom with respect to the chloro end of the polyethersulfone was 1.20. After the polyethersulfone was dissolved, the resulting solution was heated at 200° C. (internal temperature: about 180° C.) and reacted for 8 hours.

Subsequently, the obtained reaction mixture solution was diluted with NMP and cooled to room temperature to precipitate unreacted potassium carbonate and potassium chloride generated as a by-product. The above-mentioned solution was added dropwise into water to precipitate an aromatic polysulfone, and unnecessary NMP was removed by filtration, thereby obtaining a precipitate. The obtained precipitate was carefully washed repeatedly with water and dried by heating at 150° C. to obtain an amino group-containing aromatic polysulfone having an amino group at the end. Table 1 shows the amount of amino group ends, Tg, weight average absolute molecular weight (Mw), polydispersity (Mw/Mn), reduced viscosity and peel strength. In the following Table 1, the number of amino groups at the end of the polymer chain per 100 repeating units represented by the formula (A) is described as "amount of amino group ends".

Comparative Example 2

A polyethersulfone (SUMIKAEXCEL PES3600P manufactured by Sumitomo Chemical Co., Ltd.) was used as an aromatic polysulfone having a chlorine atom at the end. Table 1 shows the amount of amino group ends, Tg, weight average absolute molecular weight (Mw), polydispersity (Mw/Mn), reduced viscosity and peel strength.

TABLE 1

| | Amount of amino group ends | Tg (° C.) | Absolute molecular weight Mw (g/mol) | Mw/Mn | Reduced viscosity (dL/g) | Peel strength (N/cm²) Average (n = 6) |
|---|---|---|---|---|---|---|
| Ex. 1 | 2.1 | 224 | 28,200 | 2.27 | 0.367 | 11.6 |
| Comp. Ex. 1 | 3.0 | 216 | 16,100 | 1.92 | 0.268 | 7.3 |
| Comp. Ex. 2 | Undetected | 225 | 26,400 | 2.55 | 0.367 | 3.9 |

<Production of Aromatic Polysulfone Composition>

The aromatic polysulfone solution of Example 1 and the aromatic polysulfone solution of Comparative Example 2 were mixed at 50:50 (mass ratio) and 25:75 (mass ratio) to produce aromatic polysulfone compositions of Examples 2 and 3. Table 2 shows the results when the peel strength test was performed using these. In the following Table 2, the results of both Example 1 and Comparative Example 2 are shown. In Examples 2 and 3, the glass transition temperature (Tg) was measured for the aromatic polysulfone composition.

TABLE 2

| | Mixing ratio | | | |
|---|---|---|---|---|
| | Aromatic polysulfone solution of Ex. 1 | Aromatic polysulfone solution of Comp. Ex. 2 | Tg (° C.) | Peel strength (N/cm²) Average (n = 6) |
| Ex. 1 | 100 | 0 | 224 | 11.6 |
| Ex. 2 | 50 | 50 | 224 | 11.3 |
| Ex. 3 | 25 | 75 | 222 | 7.3 |
| Comp. Ex. 1 | 0 | 100 | 225 | 3.9 |

As shown in the above results, it became clear that Examples 1 and 2 had higher peel strengths than those of Comparative Examples 1 and 2 and high adhesive strengths.

When Example 3 was compared with Comparative Example 2, Example 3 in which the aromatic polysulfone of Example 1 was mixed was found to have a peel strength about twice as high as that of Comparative Example 2 and a high adhesive strength.

INDUSTRIAL APPLICABILITY

Since the present invention can provide an aromatic polysulfone that exhibits high adhesiveness, an aromatic polysulfone composition, and a method for producing an aromatic polysulfone, it is extremely useful industrially.

The invention claimed is:

1. An aromatic polysulfone comprising an amino group-containing aromatic polysulfone including a repeating unit represented by the following general formula (A) at 60 mol % or more with respect to the total amount of all the repeating units constituting the amino group-containing aromatic polysulfone, and having an amino group at least at one polymer chain end, and having a weight average absolute molecular weight (Mw) of 20,000 g/mol or more, a reduced viscosity (unit: dL/g) of 0.35 or more,
    wherein the number of amino groups at the polymer chain end is 0.4 or more per 100 repeating units represented by the formula (A), and having a peel strength of 8 N/cm² or more and 20 N/cm² or less;

$$-Ph1-SO2-Ph2-O-\qquad (A)$$

wherein Ph1 and Ph2 are each independently a phenylene group which may have a substituent;
    wherein the peel strength is determined by pulling a three-layer laminate at a tensile strength of 5 mm/min at 23° C. and a humidity of 50%, wherein the three-layer laminate is formed by applying a 15 weight % solution of the aromatic polysulfone in NMP to an electrolytic copper foil having a thickness of 18 microns, drying the applied solution on the copper foil to form a coating film, heat treating the coating film to form a resin layer on the copper foil, applying an electrolytic copper foil having a thickness of 18 microns on the resin layer to form a three-layer structure, and pressure bonding the three layer structure to form the three-layer laminate.

2. The aromatic polysulfone according to claim 1, which has a glass transition temperature (Tg) of 220° C. or higher.

3. An aromatic polysulfone composition comprising the aromatic polysulfone according to claim 1 and another different aromatic polysulfone.

4. A method for producing an aromatic polysulfone according to claim 1, the method comprising
    allowing a polycondensation reaction between a phenoxy end or phenolate end generated as a by-product and a halogen end by condensing an aromatic halogenosulfone compound with an amino compound, wherein said polycondensation reaction comprises:
    mixing said aromatic halogenosulfone compound and said amino compound such that a molar ratio of an amino group of said amino compound with respect to a halogen atom at an end of said aromatic halogenosulfone compound is less than 1.0; and
    reacting while heating at a temperature higher than 180° C.

* * * * *